United States Patent [19]

Ziu

[11] Patent Number: 5,141,184
[45] Date of Patent: Aug. 25, 1992

[54] UNIVERSAL CENTERING SUPPORT DEVICE FOR DOUBLE CONTAINMENT PIPE ASSEMBLIES

[75] Inventor: Christopher G. Ziu, Somerville, Mass.

[73] Assignee: Double Containment Systems, Monroe, Conn.

[21] Appl. No.: 721,966

[22] Filed: Jun. 27, 1991

[51] Int. Cl.$^5$ ................................................. F16L 3/00
[52] U.S. Cl. ........................................ 248/49; 138/113
[58] Field of Search .................... 248/74.1, 49, 68.1; 138/113, 114, 111, 108, 104; 16/108, 109, 2

[56] References Cited

U.S. PATENT DOCUMENTS

| | | |
|---|---|---|
| 430,010 | 6/1890 | Flad . |
| 666,361 | 1/1901 | Smead . |
| 1,778,714 | 10/1930 | Cafiero .................... 16/108 X |
| 1,846,550 | 2/1932 | Gottwald . |
| 1,909,075 | 5/1933 | Ricker et al. . |
| 2,504,478 | 4/1950 | Whatley .................. 248/49 X |
| 2,603,347 | 7/1952 | Fish ............................... 206/16 |
| 2,849,027 | 8/1958 | Tetyak ........................... 138/48 |
| 2,875,987 | 3/1959 | LaValley ..................... 257/254 |
| 2,914,090 | 11/1959 | Isenberg ....................... 138/63 |
| 3,065,768 | 11/1962 | Delsa ............................ 138/148 |
| 3,250,297 | 5/1966 | Mooneyham ................ 138/113 |
| 3,417,785 | 12/1968 | Andrews ..................... 138/108 |
| 3,642,308 | 2/1972 | Zeile, Jr. et al. .............. 285/47 |
| 3,765,629 | 10/1973 | Voelker et al. ................ 248/68 |
| 3,789,129 | 1/1974 | Ditscheld ..................... 174/28 |
| 3,856,246 | 12/1974 | Sinko ............................ 248/68 |
| 3,863,679 | 2/1975 | Young .......................... 138/106 |
| 3,964,754 | 6/1976 | Murai et al. ................... 277/101 |
| 4,036,617 | 7/1977 | Leonard et al. ................. 62/55 |
| 4,100,367 | 7/1978 | Netzel .......................... 174/28 |
| 4,122,298 | 10/1978 | Brandt .......................... 174/28 |
| 4,301,838 | 11/1981 | Bignell ........................ 138/112 |
| 4,529,009 | 7/1985 | Horner et al. ................ 138/111 |
| 4,691,741 | 9/1987 | Affa et al. .................... 138/113 |
| 4,694,865 | 9/1987 | Tauschmann ................ 138/148 |
| 4,751,945 | 6/1988 | Williams ..................... 138/117 |
| 4,786,088 | 11/1988 | Ziu .............................. 285/138 |
| 4,804,158 | 2/1989 | Collins et al. ............... 248/74.4 |
| 4,806,705 | 2/1989 | Chen ........................... 174/135 |
| 4,834,825 | 5/1989 | Adams et al. ............ 138/111 X |
| 4,930,544 | 6/1990 | Ziu .............................. 138/113 |

*Primary Examiner*—Alvin C. Chin-Shue
*Attorney, Agent, or Firm*—Kramer, Brufsky & Cifelli

[57] ABSTRACT

A centering support for a double containment pipe assembly consists of a three-piece assembly including an outer ring and a pair of mirror-image inner rings having tabs which are inserted into holes in the outer ring from opposite sides. The diameter of the outer ring is slightly smaller than the inner diameter of the outer pipe or conduit of the double containment pipe assembly and is inserted into an outer pipe at spaced locations therealong. The inside diameter of the inner rings are slightly wider than the outside diameter of the primary or inner pipe and they may receive therethrough the inner pipe. The inner rings and outer ring can be formed from dissimilar materials which are weldable to the outer pipe and inner pipe, respectively, at selected support points.

16 Claims, 2 Drawing Sheets

UNIVERSAL CENTERING SUPPORT DEVICE FOR DOUBLE CONTAINMENT PIPE ASSEMBLIES

BACKGROUND OF THE INVENTION

1. Field of the Invention

This invention relates to a device for supporting an inner or primary pipe within an outer containment pipe of a double containment pipe assembly and, more particularly, a support for a pipe which can be constructed of a different material than the outer or containment pipe.

2. Background Information

Hazardous fluids cannot be routinely conveyed in open top drainage channels, but instead in enclosed pipes or conduits. Recognizing that such pipes and conduits can leak because of manufacturing defects, excessive pressure, corrosion or other reasons, the prior art has devised dual containment systems which generally involve the placement of a relatively small fluid carrying closed-wall conduit or pipe within a larger closed-wall conduit or pipe which does not carry fluids except in the event of a leak of liquid carried by the inner conduit. The smaller conduit or pipe is supported by resting directly on the lower, inner wall of the outer conduit or pipe. Alternatively, supports have been proposed wherein the inner pipe may be supported in spaced relation to the lower inner wall of the outer conduit or pipe. Examples of such supports are illustrated in U.S. Pat. Nos. 4,751,945; 3,863,679; and 3,417,785.

While such supports may be used to space the inner and outer pipes and provide ready access to the inner pipe as spaced locations along the outer pipe, the supports shown in the prior art do not lend themselves to support pipes constructed from two entirely different materials. With such a support, the inner and outer pipes may be rigidly connected together by welding them to the same support.

Often, it is desirable to use weldable, dissimilar, thermoplastic materials for the inner and outer pipes. These include crystalline and partially crystalline thermosplastics from the vinyl, polyolefin, fluoropolymer and polyketone families. When a combination of these materials are to be used, the inner and outer pipes may be welded together at the end of each segment of pipes or fittings, directly at each of the unique supports of the present invention. Once the ends of pipes and/or fitting segments are rigidly attached together by welding them to the supports, the dissimilar inner and outer pipes may subsequently be joined in a simultaneous fashion with the use of butt welding techniques.

An example of where this arrangement would be beneficial is where polypropylene, a commonly used material for acid/caustic piping, is used as the material of construction of the primary or inner piping. Normally, a polypropylene material would be used as the material of the secondary or outer, containment piping as well, if a simultaneous fusion method is to be the desired method of joining. However, the use of high density polyethylene piping for the outside piping would represent a substantially less expensive selection. Therefore, a combination of polypropylene/high density polyethylene pipes that would be capable of being simultaneously welded would represent a highly economical selection. Since the temperatures of welding and the specific welding pressures of the materials are very similar, this is entirely feasible and very readily capable of being done.

Other features of this support that make it desirable have to do with the structural and mechanical aspects of its design. The support is designed so that it supports the inner pipe in such a way that loads between the inner and outer piping are very evenly distributed The magnitude of these loads are kept to a minimum, and in any case there is the complete avoidance of point loads created on either the primary and secondary, or outer, containment piping.

SUMMARY OF THE INVENTION

In accordance with the invention, the centering device consists of a three-piece assembly including an outer ring and a pair of mirror-image inner rings having tabs which are inserted into holes in the outer ring from opposite sides The diameter of the outer ring is slightly smaller than the inner diameter of the outer pipe or conduit of the double containment pipe assembly and is inserted into an outer pipe at spaced locations therealong. The inside diameter of the inner rings are slightly wider than the outside diameter of the primary or inner pipe and they may receive therethrough the inner pipe. The inner rings and outer ring can be formed from dissimilar materials which are weldable to the outer pipe and inner pipe, respectively, at selected support points. The inner rings can also be formed from dissimilar materials to accommodate different primary pipes which may be abutted end-to-end in tandem within the dual containment assembly. A portion of the outer ring is also provided in contiguous relation to the inner diameters of the inner rings wherein even if the inner and outer pipes are formed from the same material, the inner pipe can be welded to the inner diameter of the outer ring to rigidly join the inner and outer pipes to the same support, rendering the centering support device truly universal in use.

BRIEF DESCRIPTION OF THE DRAWINGS

Further objects and advantages of the invention will become more apparent from the following description and claims, and from the accompanying drawings, wherein:

DETAILED DESCRIPTION OF THE PREFERRED EMBODIMENT

Figure 2:
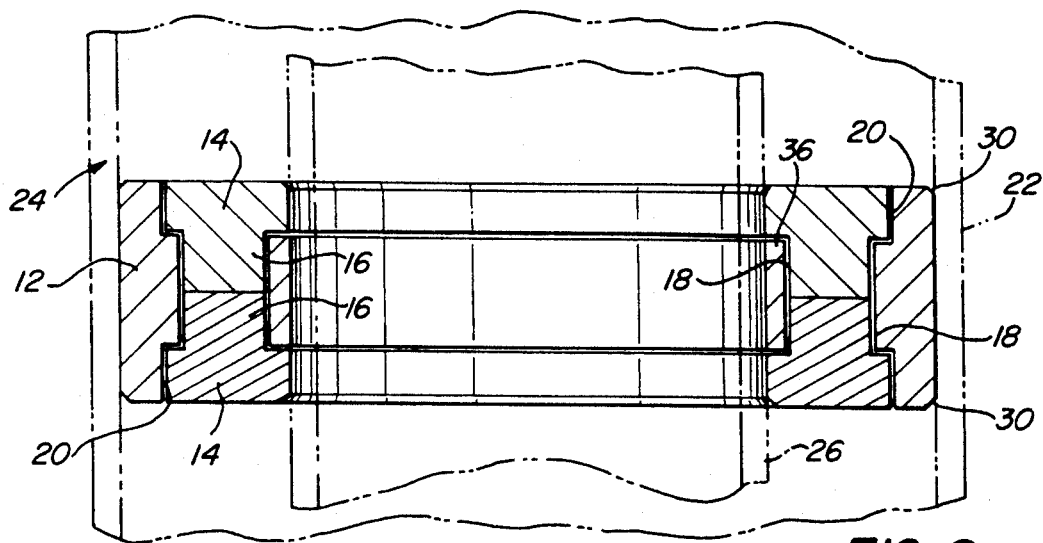
FIG. 2 is a cross-sectional view taken substantially along the plane indicated by line 2—2 of FIG. 1 and illustrating the manner of use of the device in the support of an outer and inner pipe of a double containment pipe assembly indicated in phantom lines.
Figure 1:
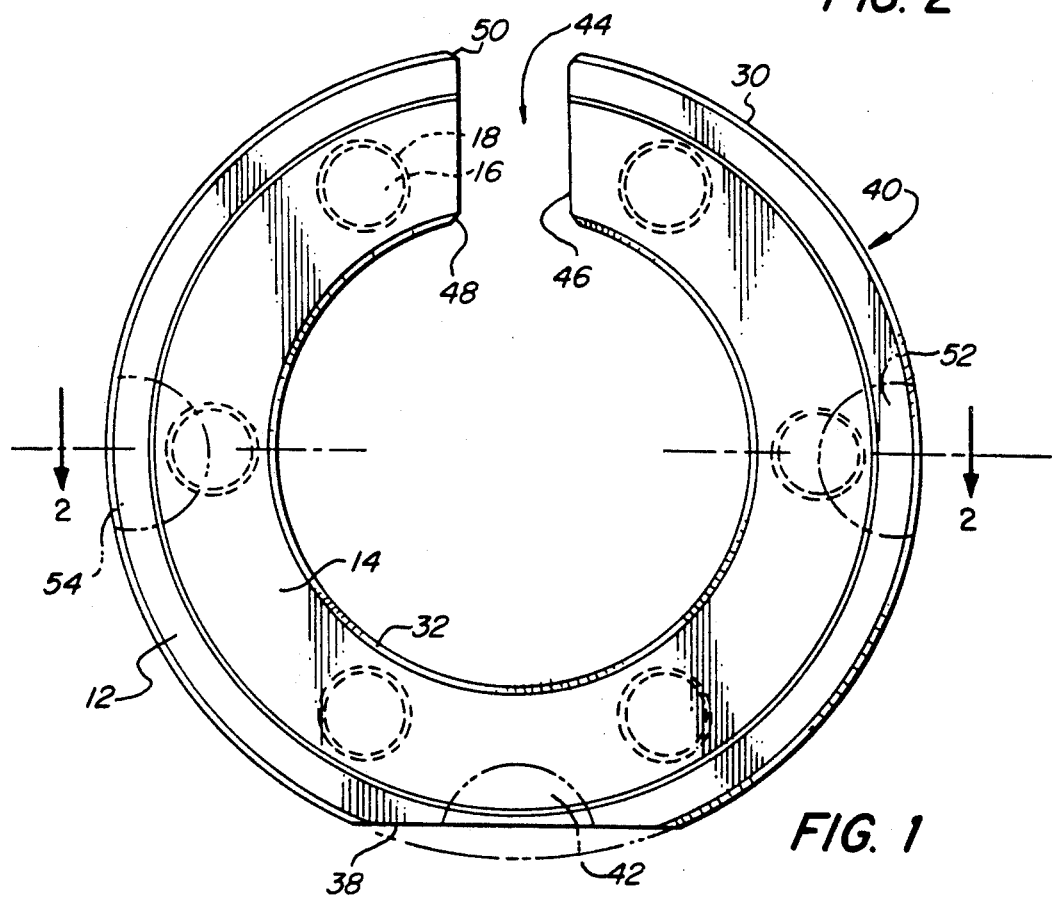
FIG. 1 is an end view in elevation of the assembled universal centering support device of the present invention.
Figure 3:
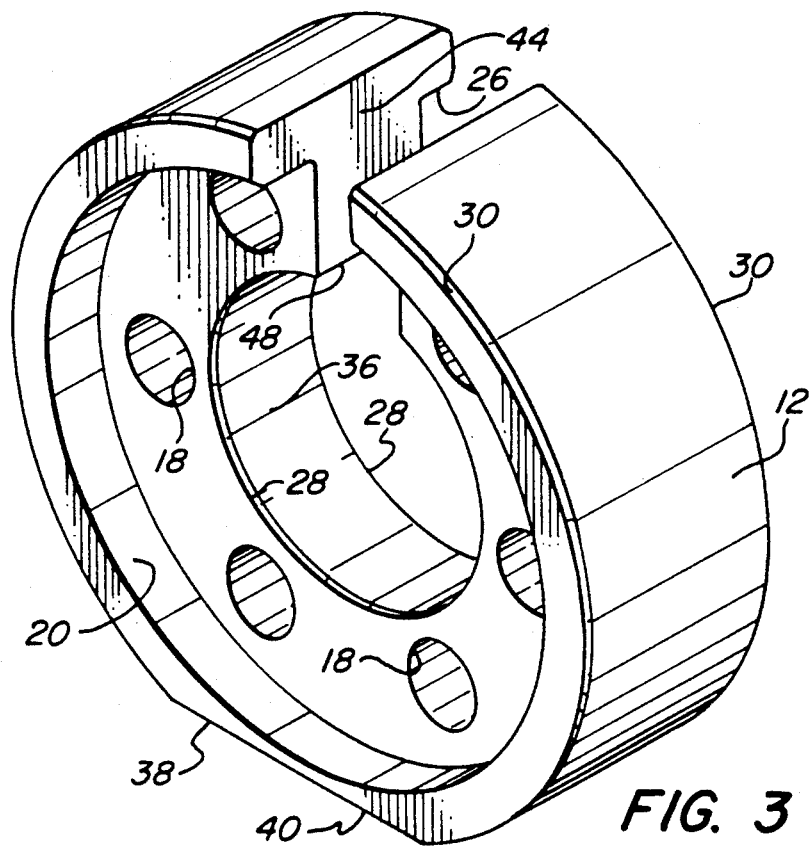
FIG. 3 is a perspective view of the outer ring of the assembled universal centering support device of FIG. 1.
Figure 4:
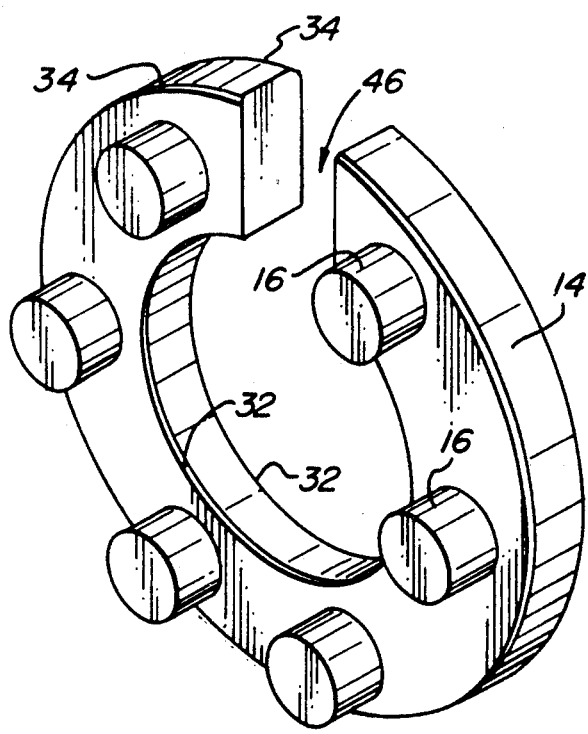
FIG. 4 is a perspective view of one of the inner rings of the assembled universal centering support device of FIG. 1.

Referring now to the drawings in detail, wherein like numerals indicate like elements throughout the several views, the centering support device 10 of the present invention consists of a three-piece assembly including an outer ring 12 and a pair of mirror-image inner rings 14 having tabs 16 which are inserted into holes 18 in the outer ring 12 from opposite sides, and may be welded together.

The outer ring 12 may be constructed from essentially any type of material including metal, reinforced thermosetting plastic, or thermoplastic. Ring 12 has a counterbore 20 machined on both of its sides in order to accommodate the two matching inner rings 14.

The diameter of the outer ring 12 is slightly smaller than the inner diameter of an outer pipe or conduit 22 of a double containment pipe assembly generally indicated as 24 and is inserted into an outer pipe at spaced locations therealong.

The inside diameter of the outer ring 12 is slightly wider than the outside diameter of the primary or inside pipe 26 to which it can be attached, if desired, as described hereinafter.

There is a bevel 28 applied to the inside diameter of the outer ring 12 on both sides of the outer ring. This allows the assembly to be readily slipped over the primary or inside pipe 26.

The outside diameter of the ring 12 is slightly less than the inside diameter of the secondary containment or outside pipe 24 to which it is to be attached and there is a bevel 30 applied to the outside diameter of the ring 12 on both sides of the ring. This allows the inner piping 26 and secondary containment piping 22 to be slipped over and through the inner and outer diameter of ring 12, respectively.

The width of the outer ring 12 is determined by the thickness required to allow both pipes 22,26 and the ring itself to safely withstand all loads that the system may be subjected to. These include all applicable loads that might act in a concurrent fashion.

The inside diameter of the inner rings 14 are slightly wider than the outside diameter of the primary or inner pipe 26 and they may also receive therethrough the inner pipe 26. Each inner ring 14 may also be constructed from any type of material, e.g., metal, reinforced thermosetting plastic, and thermoplastic. The overall dimensions of each inner ring 14 matches the dimensions of the counterbore 20 of the outer ring 12.

There is a bevel 32 applied to the inside diameter of each ring 14 on both sides of the ring. This also allows the assembly to be readily slipped over the primary or inside piping 26. The outside diameter of each ring 14 is sized to enable the part to fit snugly inside of the counterbore 20. There is also a bevel 34 applied to the outside diameter of each ring 14 on both sides of the ring. This allows the devices to be readily inserted into the counterbore 20.

The width of the tabs 16 should be approximately one half the width of the matching tab holes 18.

The inner rings 14 and outer ring 12 can be formed from dissimilar materials which are weldable to the inner pipe 26 and outer pipe 22, respectively, at selected points. The inner rings 14 can also be formed from dissimilar materials themselves to accommodate different primary pipes 26 which may be abutted end-to-end in tandem within the dual containment assembly 24. The inner diameter portion 36 of the outer ring 12 is also provided in contiguous relation to the inner diameter portions of the inner rings 14 wherein even if the inner and outer pipes 22,26 are formed from the same material, the inner pipe 26 can be welded to the inner diameter portion 36 of the outer ring 12, to rigidly join the inner and outer pipes to the same support, rendering the centering support device truly universal in use.

A chord 38 is cut from the circle at the bottom (6 o'clock) position of the outer ring 12 to allow a space for fluid to flow, and possibly leak detection cable to be installed. The sharp edge 40 created at the intersection of the chord with the circumference of the ring 12 must be beveled, along the entire width of the part, and on both sides, in order to prevent the occurrence of potential point loads on the inner wall of the secondary containment piping, at the contact point. The height of the chord that is cut from the ring 12 depends on the annular clearance needed and the thickness required at the base of the ring 12. In lieu of chord 38, a half-circular cutout 42 may be formed at the 6 o'clock position on the circumference of ring 12.

A complete rectangular section 44 and 46 is removed from the top of the outer ring 12 and each of the inner rings 14, respectively, to create a vent space for air/gas to be vented across the annulus. Without a vent space at the 12 o'clock position of the annular space, there could be an accumulation of entrapped air in the annulus during flushing and testing operations. The edge 50 of the top of the opening 44 of ring 12 should be beveled along the entire width of the device and on both sides, in order to prevent the occurrence of potential point loads on the inner wall of the secondary containment piping 22 at the contact point. The design of the opening 44 may have several variations, including the mirror-image of the design of the 6 o'clock position. The edge 48 at the bottom of the opening 44 should also be beveled in order to prevent the occurrence of potential point loads on the outer wall of the primary piping 26 at the contact point.

There may also be additional annular openings 52,54 at the 3 o'clock and 9 o'clock positions along the circumference of the ring 12, in place of tabs 16 received in openings 18. Although this is normally not needed, these openings will allow for better flow through the annular spaces, in addition to correcting for a device that is misaligned during the installation process.

Instead of inserting the inner pipe 26 through the interior of the centering support assembly, the primary pipe may consist of modular sections butt welded to the face of the inner rings 14 which, in the case of a leak, can ease maintenance and repair.

What is claimed is:

1. A centering support for a double containment pipe assembly, comprising:
    an outer ring adapted to be seated in the interior of an outer containment pipe of a double containment pipe assembly, said outer ring including,
    at least one counterbore in a side surface thereof, and
    a plurality of holes in communication with said counterbore spaced along the circumference of the exposed counterbored side of said outer ring;
    at least one inner ring adapted to mount a primary pipe of said double containment pipe assembly seated in said counterbore in said outer ring, said inner ring having,
    a plurality of tabs spaced about its circumference received in the holes spaced along the circumference at the exposed counterbored side of said outer ring and projecting substantially in the axial direction of said inner ring to connect said inner and outer rings;
    said inner and outer rings being formed from different materials wherein said support could connect an outer containment pipe and an inner primary pipe of said double containment pipe assembly formed from dissimilar materials.

2. A centering support for a double containment pipe assembly, comprising:
an outer ring adapted to be seated in the interior of an outer containment pipe of a double containment pipe assembly, said outer ring including,
counterbores in opposed side surface thereof, and
a plurality of holes in communication with each of said counterbores spaced along the circumference of the exposed counterbored side of said outer ring;
an inner ring adapted to mount a primary pipe of said double containment pipe assembly seated in each of said counterbores in said outer ring, each of said inner rings having,
a plurality of tabs spaced about its circumference received in the holes spaced along the circumference at the exposed counterbored side of said outer ring to connect said inner and outer rings;
at least one of said inner rings and said outer ring being formed from different materials wherein said support could connect an outer containment pipe and an inner primary pipe of said double containment pipe assembly formed from dissimilar materials.

3. The support of claim 2 wherein each of said inner rings and said outer ring are all formed from different materials.

4. The support of claim 2 wherein each of said inner rings and said outer ring have contiguous portions along the inner diameter of the centering support assembly adapted to contact and mount the inner primary pipe of said double containment pipe assembly received therethrough.

5. A centering support for a double containment pipe assembly, comprising:
an outer ring adapted to be seated in the interior of an outer containment pipe of a double containment pipe assembly, said outer ring including,
at least one counterbore in a side surface thereof, and
a plurality of holes in communication with said counterbore spaced along the circumference of the exposed counterbored side of said outer ring;
at least one inner ring adapted to mount a primary pipe of said double containment pipe assembly seated in said counterbore in said outer ring, said inner rings having,
a plurality of tabs spaced about its circumference received in the holes spaced along the circumference at the exposed counterbored side of said outer ring to connect said inner and outer rings;
said inner and said outer rings being formed from different materials wherein said support could connect an outer containment pipe and an inner primary pipe of said double containment pipe assembly formed from dissimilar materials; and
wherein a section is cut from the circumference of the assembled inner and outer rings to permit the flow of fluid therethrough.

6. A centering support for a double containment pipe assembly, comprising:
an outer ring adapted to be seated in the interior of an outer containment pipe of a double containment pipe assembly, said outer ring including,
at least one counterbore in a side surface thereof and a chord cut from an outer surface thereof, and
a plurality of holes in communication with said counterbore spaced along the circumference of the exposed counterbored side of said outer ring;
at least one inner ring adapted to mount a primary pipe of said double containment pipe assembly seated in said counterbore in said outer ring, said inner ring having,
a plurality of tabs spaced about its circumference received in the holes spaced along the circumference at the exposed counterbored side of said outer ring to connect said inner and outer rings;
said inner and outer rings being formed from different materials wherein said support could connect an outer containment pipe and an inner primary pipe of said double containment pipe assembly formed from dissimilar materials.

7. A centering support for a double containment pipe assembly, comprising:
an outer ring adapted to be seated in the interior of an outer containment pipe of a double containment pipe assembly, said outer ring including,
at least one counterbore in a side surface thereof,
a beveled surface along the circumference of opposed sides thereof, and
a plurality of holes in communication with said counterbore spaced along the circumference of the exposed counterbored side of said outer ring;
at least one inner ring adapted to mount a primary pipe of said double containment pipe assembly seated in said counterbore in said outer ring, said inner ring having,
a plurality of tabs spaced about its circumference received in the holes spaced along the circumference at the exposed counterbored side of said outer ring to connect said inner and outer rings;
said inner and outer rings being formed from different materials wherein said support could connect an outer containment pipe and an inner primary pipe of said double containment pipe assembly formed from dissimilar materials.

8. The support of claim 7 wherein the outer circumference of said inner ring includes a beveled surface along opposed sides thereof received with said counterbore.

9. The support of claim 8 wherein the inner diameter circumference of said inner ring includes a beveled surface along opposed sides thereof.

10. A centering support for a double containment pipe assembly including an inner pipe located with the outer pipe, comprising:
an outer ring member including a surface shaped to substantially conform to a surface of the outer pipe for coupling the outer ring member to the outer pipe, a surface defining a recess in the outer ring member, and a plurality of apertures spaced apart from each other and formed within the surface defining the recess; and
at least one inner ring member received within the recess in the outer ring member for supporting the inner pipe within the outerpipe, the inner ring member including a plurality of tab members spaced apart from each other and projecting substantially in the axial direction of the inner ring member, each tab member being received within a respective aperture of the outer ring member for substantially preventing rotation of the inner ring member and the outer ring member relative to each other.

11. A center support as defined in claim 10, wherein the outer ring member includes two surfaces defining recesses in opposite sides of the outer ring member relative to each other, and two inner support members, each inner support member being received within a respective recess of the outer ring member.

12. A center support as defined in claim 10, wherein the inner and outer ring members are formed of different materials in comparison to each other for facilitating connection of an outer pipe and inner pipe formed of different materials in comparison to each other.

13. A center support as defined in claim 10, wherein the inner ring member and outer ring member each include contiguous surfaces for contacting and supporting the inner pipe.

14. A center support as defined in claim 10, wherein the surface of the outer ring member is shaped to substantially conform to the interior of the outer pipe for coupling the outer ring member to the outer pipe and defines at least one portion spaced away from the interior surface of the outer pipe to permit fluid to flow between the outer pipe and the outer ring member.

15. A center support as defined in claim 10, wherein the surface of the outer ring member is shaped to substantially conform to the interior of the outer pipe for coupling the outer ring member to the outer pipe and defines beveled edges on opposite sides of the surface relative to each other.

16. A center support as defined in claim 10, wherein the inner ring member defines at least one bevelled surface adjacent the inner pipe.

* * * * *